Patented Nov. 10, 1931

1,831,032

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

PRODUCTION OF REFINED WOOD PULP

No Drawing.    Application filed November 30, 1929.    Serial No. 410,887.

This invention relates to the production of chemical wood pulp, and more particularly a refined wood pulp such as is useful not only in the manufacture of high grade papers but also in the preparation of various cellulose derivatives.

In producing refined wood pulps, i. e., pulps of high alpha cellulose content, one of the most significant costs has been that of the chemicals employed for dissolving the cementitious material from the raw wood and for dissolving other non-alpha cellulose components, such as pentosans, which are associated with usual kraft, sulphite, or other commercial wood pulps. One process extensively employed for producing a refined wood pulp comprises the step of liberating the wood fibers by cooking in an acid sulphite liquor and then cooking the resulting pulp in caustic soda solutions or other alkaline liquors. Such a process not only necessitates the use of considerable chemical, but requires the use of different types of cooking apparatus, as the usual brick-lined acid sulphite digesters cannot withstand the action of alkaline cooking liquors, and the usual mild steel alkaline digesters or tanks are rapidly corroded under the action of acid cooking liquors.

An object of the present invention is to make possible the production of refined wood pulps with a low consumption of chemical and without necessitating the use of different types of cooking apparatus. I have found that this object may be realized by initially cooking wood in substantially only water, under maximum temperature conditions consistent with non-charring of the wood, and then cooking the wood in a suitable alkaline liquor, for instance, in kraft or soda liquor, to complete fiber liberation.

Under high temperature conditions, the water evidently extracts from the wood a considerable proportion of the readily soluble or hydrolyzable components, especially pentosans, as subsequent cooking of the wood to complete fiber liberation in an alkaline liquor of an alkalinity not exceeding that of the usual kraft liquor comprising caustic soda and sodium sulphide results in a pulp of high alpha cellulose content and of a pentosan content much lower than that of the usual kraft pulp. That a substantial amount of organic matter has been reacted upon and dissolved by the water is indicated by the brown color of the aqueous extract after the initial cooking operation. This extract is preferably drained from the wood before cooking it in an alkaline liquor, in order to avoid consumption of the alkali by dissolved organic matter. During the cooking operation in water, a slightly acidic condition is generated in the water, as a result of the formation of organic acids, but these acids are not drastic in their action on steel, so that the steel digester ordinarily employed for alkaline cooking may be used for carrying out both the initial cooking operation in water and the subsequent cooking operation in alkaline liquors.

One specific example of procedure falling within the purview of my invention may be substantially as follows. A suitable wood, such as spruce, is chipped as usual and cooked in water in a closed digester of the alkaline type, for two to four hours or longer, at temperatures of from 300° to 400° F. At the end of this cooking operation, the chips are brown and practically as hard as the raw wood, even though a substantial proportion of organic matter has been removed therefrom and their porosity has been considerably increased. The resulting muddy brown aqueous extract may be drained from the chips and, if desired, may be used in whole or in part, while hot, for the preliminary cooking of other raw wood. The cooked chips may be washed, if desired, in the digester, to remove residual aqueous extract therefrom, whereupon a kraft liquor containing from 1.5 to 2.0 pounds of alkali per cubic foot as caustic soda and sodium sulphide but calculated as $Na_2O$, may be added to the digester, and the digester contents heated while confined for two to four hours at 300° to 350° F. The wood fibers are liberated by the alkaline cooking operation, and the resulting pulp is not only one of excellent physical characteristics, but of high alpha cellulose content and of low pentosan content and low solution viscosity.

Such a product is not only serviceable for use as a raw material in high grade papers, but also in the preparation of cellulose derivatives, particularly of the acetate, where a low pentosan content means clarity in solutions prepared from the acetate derivative.

I present herein a table giving certain of the important physical characteristics and the major components of the usual commercial kraft pulp as compared with a wood pulp produced as herein described, using the same amount of alkali in the second cooking operation as in the kraft process:

|  | Kraft pulp | Pulp produced by new process |
|---|---|---|
| Strength | 150 | 120 |
| Tear | 280 | 380–420 |
| Alpha cellulose | 89%–90% | 95%–96.5% |
| Pentosans | 7%–10% | 1.5%–2.5% |
| Solution viscosity | 20–50 | 1.0 – 3.0 |
| Bleachability | Difficultly bleachable | Bleachable |

From the foregoing table, which is more or less representative of the two types of unbleached pulp, it can be seen that a product produced as herein described is much better in tear resistance, which latter characteristic is especially sought for by papermakers. It also has the characteristic softness of a wood pulp of high alpha cellulose content, which characteristic is absent in a kraft pulp. It is not only notably better in all-round characteristics for papermaking in unbleached condition, but especially so when bleached, as it requires much less bleach and undergoes much less oxidation and injury in physical characteristics during bleaching than kraft pulp. It is far superior as a raw material for the preparation of cellulose derivatives, not only because of its greater purity as indicated by its high alpha cellulose and low pentosan content, but because of its remarkably low solution viscosity when the initial cooking operation in water is effected at high temperature, which means that solutions of the resulting cellulose derivative will be of much lower viscosity than solutions of similar concentration prepared from the usual commercial pulps. Such a low solution-viscosity pulp when bleached to final whiteness is eminently suitable for conversion into cellulose nitrate intended for lacquer manufacture or for conversion into a fiber which may be xanthated directly, i. e., without the usual long-ageing period after forming so-called soda cellulose. But, in some cases, as in the preparation of cellulose acetate or cellulose nitrate for film manufacture, where a product of higher solution viscosity is desired, such a product may be obtained by carrying out the initial cooking operation in water at suitably lower temperature and by adding to the water a very small amount of suitable chemical, such as alkali, which favors the production of a product of higher solution viscosity by reacting with and neutralizing the traces of acid generated during cooking and which favor the production of a product of lower solution viscosity. For instance, the water may contain in solution from 0.2% to .1% sodium carbonate or sodium sulphite when cooking is started.

The specific procedure hereinbefore given is subject to various modifications, but the two major steps hereinbefore outlined are to be practised in all the modifications. For instance, the initial cooking operation may be effected in an aqueous liquor which is rendered faintly alkaline by the addition of alkali such as caustic soda, sodium sulphide, sodium carbonate, sodium sulphite, lime, or the like, in an aqueous solution which has been rendered faintly acid by the addition of acids or acid salts, such as alum, sodium bisulphite, acetic acid, or the like. In no case, however, is chemical used in such amount in the initial aqueous liquor as to constitute the chief agent for dissolving organic matter from the wood, the water at high temperature primarily being relied upon for this purpose. In carrying out the initial cooking operation in substantially only water, it is preferable to use sufficient water to cover all the chips, although it is possible to submerge only a portion of the chips in water, in which case some of the chips would undergo a steam extraction, which is less satisfactory than a water extraction. In actual practice, no steam or other vapors need be released from the vapor space of the digester, but when cooking certain kinds of wood such as hemlock, fir, and pine, it may be advantageous to release steam during the cooking operation, in order to condense out and recover from the steam valuable by-products, such as turpentine, which are volatilized or distilled from the wood under the high temperatures of cooking. It may be desirable to oxidize and remove ligneous matter from the wood before carrying out the second cooking operation in an alkaline liquor, as by carrying out the cooking operation in water in the presence of an oxygen-containing atmosphere. This may be accomplished by blowing air or oxygen into the digester contents during the cooking operation, in which case the steam and gas in the vapor space at the upper end of the digester may be released and forced by a pump into the bottom of the digester so as to pass through and uniformly contact with the digester contents. Or, if desired, a similar oxidizing effect on the ligneous matter may be produced by maintaining a pressure in the digester markedly in excess of that of the steam pressure at cooking temperatures, by the use of air or oxygen. For instance, when cooking is effected at 300° F., which corresponds to a steam pressure of 75 pounds, air or oxygen may be introduced into the vapor space of the digester to raise the total pressure to from 100 to 150 pounds.

If desired, the chips may be treated with an atmosphere of chlorine, or with chlorine water after the initial cooking operation, to react upon and remove ligneous matter prior to cooking in an alkaline liquor, in which case it is possible to reduce materially the amount of alkali necessary to produce a final product of a given purity of alpha cellulose content. The chlorination of chips from which organic matter has been removed by an initial cooking operation in water as hereinbefore described is particularly advantageous, in that the chips are more porous after the extraction of organic matter, and accordingly the chlorine penetrates the chips more rapidly and effects a much more uniform action upon the ligneous matter contained therein. In carrying out such a treatment with chlorine water, the chips may be treated for about two hours at from 15° to 30° C., the chlorine usage being, say, from 4% to 10%, based on the weight of dry wood. After the treatment, the chips should be washed free of residual chlorine and reaction products, whereupon they may be cooked in an alkaline liquor as hereinbefore described, but the liquor should contain only about one pound of alkali per cubic foot, calculated as $Na_2O$, to produce a final pulp having the characteristics hereinbefore enumerated. I am aware of the fact that it has been proposed to treat wood chips, more particularly of resinous variety, with water heated to a sufficiently high temperature, to cause a melting of the resins and to dissolve water-soluble constituents from the wood, and then to digest the chips in an acid liquor to effect fiber liberation. Such a process does not result in a product having the physical characteristics and composition of the product of my process, as the initial cooking operation in water is not designed to remove those constituents of the wood which are reacted upon and dissolved only under high temperature conditions, and the second cooking operation in an acid liquor does not affect those constituents of the wood which are reacted upon and dissolved only by an alkaline liquor. My process is analogous to one comprising the cooking of wood in an acid sulphite liquor, followed by cooking in an alkaline liquor to complete fiber liberation, as cooking of the wood in substantially only water under maximum temperature conditions consistent with non-charring of the wood results in the hydrolysis of those constituents, especially pentosans, which are hydrolyzed by cooking in the usual acid sulphite liquors, whereupon when the wood is then cooked in an alkaline liquor, fiber liberation may be completed with a low consumption of alkali to produce a refined product analogous to those products which have been freed from non-alpha cellulose constituents by cooking in the usual acid sulphite liquors and then in alkaline liquors.

In converting unbleached pulps produced as herein described to final whiteness, it is desirable to maintain the high alpha cellulose content realized by previous processing. Hence, while it is possible to use the usual bleaching operations, it is preferable to use a procedure, such as follows, according to which the alpha cellulose content is preserved while high whiteness is being attained. The unbleached pulp may be treated initially at room temperature for three to four hours with water containing 3% chlorine, based on the weight of dry pulp. The chlorinated pulp is then washed and digested at elevated temperature in a weak solution of alkali such as sodium carbonate, sodium sulphite, or sodium hydroxide to remove chlorination products, whereupon the pulp may be washed and then bleached with a liquor containing 3% hypochlorite bleach, based on the weight of dry pulp, the liquor preferably also containing a small amount of free alkali, such as caustic soda, to prevent degradation of the alpha cellulose during the bleaching operation.

I claim:

1. A process which comprises cooking chipped wood for more than two hours in substantially only water at a temperature of from 300° to 400° F., and then cooking the wood in a kraft liquor comprising caustic soda and sodium sulphide to complete fiber liberation.

2. A process which comprises cooking chipped wood at elevated temperatures in substantially only water, treating the wood with chlorine, and then cooking the chlorinated product in an alkaline liquor to complete fiber liberation.

3. A process which comprises cooking chipped wood at elevated temperatures in substantially only water, in the presence of an oxygen-containing atmosphere under pressure, and then cooking the wood in an alkaline liquor to complete fiber liberation.

4. A process which comprises cooking chipped wood for more than two hours in substantially only water at a temperature above 300° F., and then cooking the wood for at least two hours to complete fiber liberation in a kraft cooking liquor containing from 1.5 to 2.0 pounds of alkali per cubic foot as caustic soda and sodium sulphide but calculated as $Na_2O$.

In testimony whereof I have affixed my signature.

GEORGE A. RICHTER.